(12) United States Patent
Hooper et al.

(10) Patent No.: US 8,081,001 B2
(45) Date of Patent: Dec. 20, 2011

(54) DEVICE, SYSTEM AND METHOD FOR AUTOMATIC SELF-TEST FOR A GROUND FAULT INTERRUPTER

(75) Inventors: William P. Hooper, Duluth, GA (US); Hugh T. Kinsel, Sugar Hill, GA (US); Susan Sneed Hooper, legal representative, Duluth, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 452 days.

(21) Appl. No.: 12/408,229

(22) Filed: Mar. 20, 2009

(65) Prior Publication Data
US 2010/0013491 A1    Jan. 21, 2010

Related U.S. Application Data (60) Provisional application No. 61/039,824, filed on Mar. 27, 2008.

(51) Int. Cl.
*G01R 31/14* (2006.01)
*G01R 31/327* (2006.01)
*H02H 3/00* (2006.01)

(52) U.S. Cl. ............................. 324/509; 324/424; 361/42

(58) Field of Classification Search .................. 324/509, 324/500, 424, 415, 416, 417, 555; 361/42; 702/58
See application file for complete search history.

(56) References Cited

U.S. PATENT DOCUMENTS

| | | | |
|---|---|---|---|
| 5,715,125 A | 2/1998 | Gershen | |
| 6,472,882 B1 | 10/2002 | Baertsch | |
| 7,525,402 B2 * | 4/2009 | Gao | ................................ 335/18 |
| 7,986,501 B2 * | 7/2011 | Kamor et al. | ................... 361/42 |
| 2007/0146945 A1 | 6/2007 | Chen | |
| 2010/0295568 A1 * | 11/2010 | Ostrovsky et al. | ......... 324/750.3 |

FOREIGN PATENT DOCUMENTS
EP       0649207 A       9/1994

OTHER PUBLICATIONS
Fairchild RV414 Low Power Ground Fault Interrupter, Rev. 1.0.6 Jun. 30, 2005, www.fairchildsemi.com.

* cited by examiner

*Primary Examiner* — Hoai-An D Nguyen (57) ABSTRACT

A self-test circuit is provided that includes a signal circuit adapted to periodically output a circuit inhibitor signal to inhibit a breaking signal from a ground fault detector. The signal circuit is also adapted to periodically output a test signal simulating a ground fault. The self-test circuit also includes an alarm circuit adapted to receive an output signal from the ground fault detector in response to detecting the ground fault, and adapted to output an alarm when the ground fault detector is not operative. The signal circuit may be further adapted to periodically output a second test signal simulating a grounded neutral condition. A ground fault circuit interrupter system and a method are also provided.

26 Claims, 8 Drawing Sheets

DEVICE, SYSTEM AND METHOD FOR AUTOMATIC SELF-TEST FOR A GROUND FAULT INTERRUPTER

This application claims the benefit of U.S. Provisional Application No. 61/039,824 filed Mar. 27, 2008, which is incorporated herein by reference.

FIELD OF THE INVENTION

The present invention relates to circuit breaker systems. In particular, the present invention provides an automatic self-test function to a ground fault interrupter circuit.

BACKGROUND INFORMATION

Residential ground fault circuit interrupter (GFCI) circuit breakers presently rely on a manual "Press to Test" pushbutton actuation by a homeowner to verify proper operation of the ground fault detection circuit. During the life of this circuit breaker several electrical stress sources (for example, lightning, line disturbances, etc.) can render this circuit inoperable. Unfortunately, the homeowner may not routinely exercise the aforementioned "Press To Test" pushbutton during this inoperative period, and therefore may not recognize the circuit failure.

Present residential GFCI circuit breakers do not provide an internal watchdog function that detects the failure(s) of the major circuit components, and non-functioning GFCI breakers have been observed in the field. The "Press To Test" manual pushbutton is not regarded as a fail-safe functional test, since many homeowners do not routinely exercise this manual test.

Typical residential GFCI circuit breakers can be rendered inoperable due to failed circuits because of environmental surges, defective components, and manufacturing issues. These GFCI circuit breakers will continue to provide branch power, but with no ground fault interruption capability.

Figure 1:
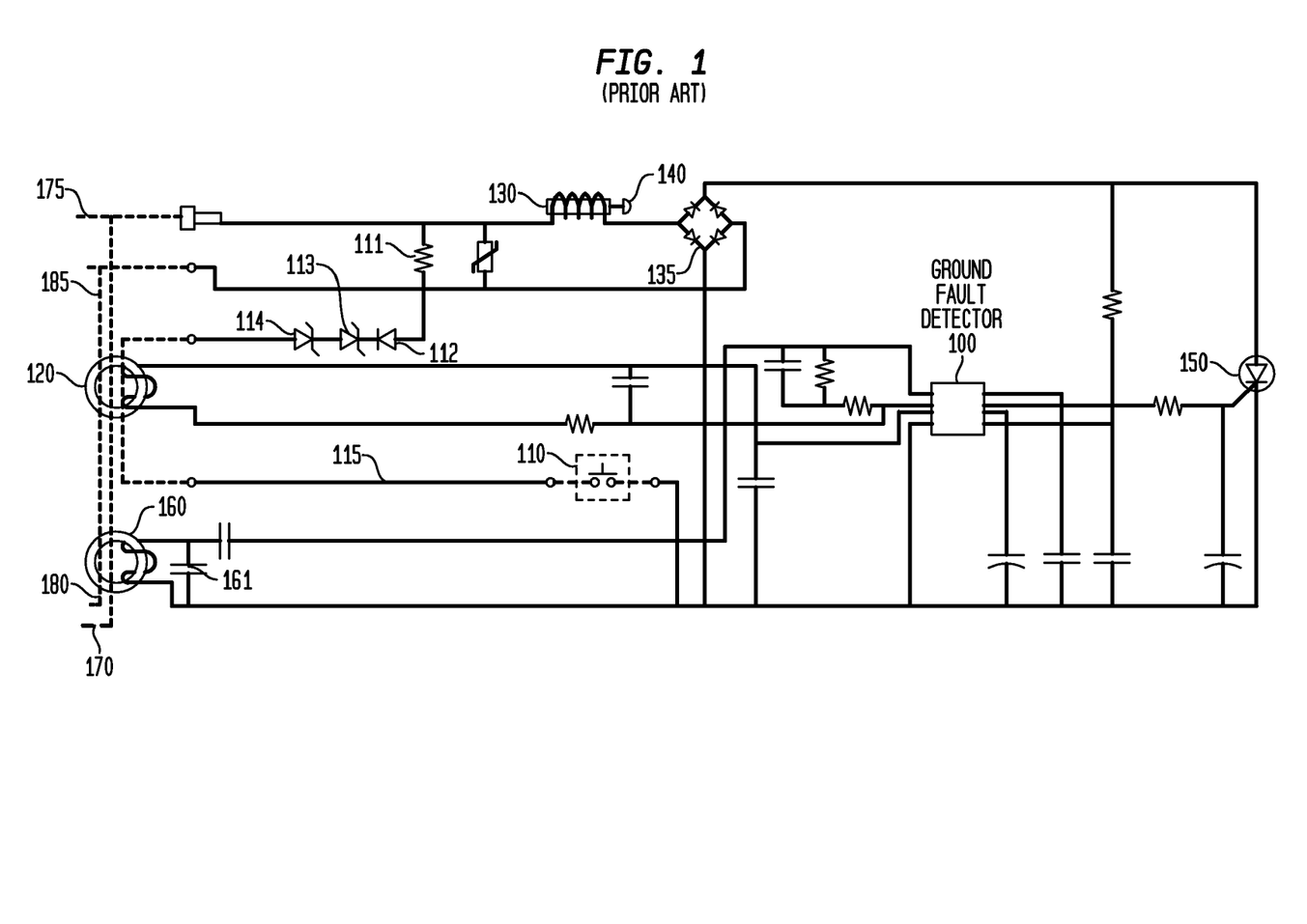
FIG. 1 illustrates a conventional ground fault interrupter circuit.

FIG. 1 shows a conventional Ground Fault Circuit Interrupter. In FIG. 1, element 100 represents a ground fault detector, which may be an integrated circuit, and specifically may be a Fairchild RV 4141A Low Power Ground Fault Interrupter. Ground fault detector 100 is electrically coupled to transformer 120, which is arranged to measure whether a ground fault arises on a circuit. The circuit may be any household item, for instance, a hair dryer, or may be any other appropriate electrical device. Line 170 represents a load hot line, and line 180 represents a load neutral line. Lines 170 and 180 both pass through transformer 120. Line 180 is continuous with line 185 which is a line neutral line, and line 170 is continuous with line 175, which is a switched hot line. When a ground fault situation exists on the load, a current difference between lines 170 and 180 exceeds a minimum threshold. This current difference between lines 170 and line 180 induces transformer 120 to output a signal that causes ground fault detector 100 to emit a breaking signal. The breaking signal causes solenoid 130 to activate plunger 140 that causes a breaker to break the circuit. Alternatively, solenoid 130 may operate to pull an armature directly or indirectly through another trigger device. The breaking signal from ground fault detector 100 turns on silicon control rectifier 150 (also referred to herein as SCR 150).

In FIG. 1, a power supply is formed by solenoid 130, bridge 135, and other discrete elements inside detector 100. Ground fault detector 100 effectively amplifies the electrical current difference in hot and neutral wires passing through transformer 120 (also referred to herein as a differential toroid) and compares the electrical current difference to a predetermined threshold. When an excessive difference is detected (for example, 5 ma), ground fault detector 100 outputs a positive going signal that is applied to the gate of SCR 150. This will cause SCR 150 to fire, forcing an actuation current to flow through solenoid 130. In turn, plunger 140 will strike an appropriate mechanical lever causing the breaker to trip.

A conventional ground fault detector circuit may also include a press-to-test button 110 (also referred to herein as a push-to-test button, or PTT button), which serves as a manual self-test feature. Press-to-test button 110 in FIG. 1 operates to test ground fault detector 100, by causing a current imbalance through transformer 120 which causes a ground fault difference current signal to be sent to ground fault detector 100. Thus, the PTT button actuation causes an actual imbalance of current by passing additional current through transformer 120 using discrete elements 111, 112, 113, and 114 arranged in series and wire 115, without returning the current back through transformer 120. Ground fault detector 100 senses this imbalance and fires SCR 150, thus causing a breaker trip condition. In this situation, the solenoid 130 would activate plunger 140 which causes a break in the circuit. The user who has pressed test button 110 to test the ground fault detector circuit is aware of the circuit breaking by seeing the breaker break, and is therefore able to confirm operation of ground fault detector 100. The user is also able to reset the circuit by resetting the breaker manually so that continued operation of the electrical appliance at the load is possible. Although the breaker installation instructions form asks the homeowner to periodically exercise PTT button 110, it is seldom actually done. Thus, failures in the GFCI circuit can render the circuit inoperable without any notice to the homeowner.

FIG. 1 also includes second transformer 160 which is adapted to determine whether a fault condition exists which does not create a sufficient current difference in transformer 120 to meet the threshold for causing ground fault detector 100 to detect a fault. The coupled signal from second transformer 160 to transformer 120 provides a positive feedback loop around an operational amplifier (also referred to herein as a sense amplifier) in the RV4141 embodiment of ground fault detector 100. Therefore, when a grounded neutral short (also referred to herein as a ground-to-neutral fault) exists, the sense amplifier (used to process imbalance current from transformer 120) turns into an oscillator circuit. A ground fault current is detected by transformer 120 and amplified by the sense amplifier. Second transformer 160 and transformer 120 become mutually coupled, producing a positive feedback loop around the sense amplifier. The newly created feedback loop causes the sense amplifier to oscillate at a frequency determined by a secondary inductance of second transformer 160 and capacitor 161. This oscillation frequency may be about 8 KHz.

The circuit of FIG. 1 also includes various diodes, resistors and capacitors arranged in a manner to enable the circuit to function appropriately. The values of the resistors and capacitors, and the arrangements of all of the elements is conventional, and the precise arrangement may be determined by one of ordinary skill in the art without undue experimentation.

SUMMARY OF THE INVENTION

The invention provides a GFCI Automatic Self-test (also referred to herein as a GAST), which provides an automatic, independent internal monitoring and alarm function that will verify proper operation of the ground fault circuit interrupter (GFCI). The GAST circuit can be added to both existing and new GFCI designs in either a circuit breaker or receptacle host configuration. The GAST addresses the problems of the prior art by automatically, independently testing the GFCI function of the device on a periodic basis. The GAST will report a visual, auditory, or both alarm to the homeowner upon a test failure, i.e., notice to the homeowner in the event of a failure to respond to a ground fault. The GAST may be added to existing or new Ground Fault Circuit Interruption (GFCI) products in order to include an automatic self-test feature.

A self-test circuit is provided that includes a signal circuit adapted to periodically output a circuit inhibitor signal to inhibit a breaking signal from a ground fault detector. The signal circuit is also adapted to periodically output a test signal simulating a ground fault. The self-test circuit also includes an alarm circuit adapted to receive an output signal from the ground fault detector in response to detecting the ground fault, and adapted to output an alarm when the ground fault detector is not operative.

In the self-test circuit, the circuit inhibitor signal and the test signal may both be adapted to cycle at a first period, and the circuit inhibitor signal may be output at least when the test signal is output. In the self-test circuit, the signal circuit may be further adapted to periodically output a second test signal simulating a grounded neutral condition, and the test signal and the second test signal may be alternating signals spliced from a master test signal. The circuit inhibitor signal and the master test signal may both be adapted to cycle at a first period, and the circuit inhibitor signal may be output at least when the test signal and the second test signal are output.

In the self-test circuit, the output signal may be received from the ground fault detector in response to the second test signal when the ground fault detector is operative. The self-test circuit may include a transformer electrically coupled to the ground fault detector and adapted to measure the ground fault of an object circuit by comparing a neutral line current and a load line current of the object circuit. The ground fault detector may include an oscillator circuit coupled to a test circuit, and a second transformer may be electrically coupled by the test circuit to the ground fault detector to complete the oscillator circuit. The second transformer may be adapted to measure a grounded neutral condition of the object circuit by comparing the object circuit and the test circuit for the oscillating signal.

In the self-test circuit, the output signal may be received from the ground fault detector in response to the ground fault when the ground fault detector is operative.

In the self-test circuit, the alarm circuit may include a detector circuit electrically coupled to the ground fault detector and a retriggerable monostable electrically coupled to the detector circuit, and the retriggerable monostable may contain a voltage that increases until the output signal is received by the detector circuit. The voltage contained in the retriggerable monostable may increase at a predetermined rate such that it takes a second period to reach a predetermined voltage from when the output signal is received by the detector circuit, the second period being longer than a first period of the test signal. An alarm output of the retriggerable monostable may be low unless the voltage exceeds the predetermined voltage, and the alarm circuit may include an alarm adapted to receive the alarm output from the retriggerable monostable and adapted to activate when the alarm output is high.

In the self-test circuit, a circuit interrupter may be electrically coupled to the ground fault detector and adapted to receive the breaking signal from the ground fault detector when both the ground fault detector detects a ground fault of a circuit and the circuit inhibitor signal is not output from the signal circuit. The circuit interrupter may include a solenoid for receiving the breaking signal, and the solenoid may be adapted to break the circuit.

A ground fault circuit interrupter system is also provided that includes a ground fault detector and a signal circuit electrically coupled to the ground fault detector and for outputting a circuit inhibitor signal to inhibit a breaking signal from the ground fault detector. The signal circuit also outputs a test signal to the ground fault detector. The system also includes an alarm circuit electrically coupled to the ground fault detector and for receiving an output signal from the ground fault detector in response to the test signal.

In the ground fault circuit interrupter system, the signal circuit may include an oscillator, the circuit inhibitor signal may be a square wave having a first length and a first period, and the test signal may be a further square wave having a second length and the first period. The first length may be equal to or greater than the second length, and the circuit inhibitor signal and the test signal may be synchronized so that during an entire time the test signal is output, the circuit inhibitor signal is also output.

In the ground fault circuit interrupter system, the signal circuit may be further adapted to periodically output a second test signal simulating a grounded neutral condition, and the test signal and the second test signal may be alternating signals spliced from a master test signal. The circuit inhibitor signal and the master test signal may both be adapted to cycle at a first period, and the circuit inhibitor signal may be output at least when the test signal and the second test signal are output.

In the ground fault circuit interrupter system, the output signal may be received from the ground fault detector in response to the second test signal when the ground fault detector is operative.

The ground fault circuit interrupter system may include a transformer electrically coupled to the ground fault detector and for measuring a ground fault of a circuit by comparing a neutral line current and a load line current of the circuit. The ground fault detector may include an oscillator circuit coupled to a test circuit, and a second transformer electrically coupled by the test circuit to the ground fault detector to complete the oscillator circuit. The second transformer may be adapted to measure a grounded neutral condition of the object circuit by comparing the object circuit and the test circuit for the oscillating signal.

In the ground fault circuit interrupter system, the alarm circuit may not receive the output signal from the ground fault detector in response to the test signal when the ground fault detector is inoperative.

In the ground fault circuit interrupter system, the alarm circuit may include a detector circuit electrically coupled to the ground fault detector and a retriggerable monostable electrically coupled to the detector circuit. The retriggerable monostable may contain a voltage that increases until the output signal is received by the detector circuit. The voltage contained in the retriggerable monostable may increase at a predetermined rate such that it takes a second period to reach a predetermined voltage from when the output signal is received by the detector circuit, the second period being longer than a first period of the test signal. An alarm output of the retriggerable monostable may be low unless the voltage exceeds the predetermined voltage, and the alarm circuit may include an alarm adapted to receive the alarm output from the retriggerable monostable and adapted to activate when the alarm output is high.

The ground fault circuit interrupter system may include a circuit interrupter electrically coupled to the ground fault detector and for receiving the breaking signal from the ground fault detector when the ground fault detector detects a ground fault of a circuit and the circuit inhibitor signal is not output from the signal circuit. The circuit interrupter may include a solenoid for receiving the breaking signal, where the solenoid is adapted to break the circuit.

A method is provided that includes periodically outputting a circuit inhibitor signal to a ground fault detector to inhibit a breaking signal from the ground fault detector. The circuit inhibitor signal is output at a first period. The method also includes outputting a test signal to the ground fault detector only if the circuit inhibitor signal is output. The test signal tests the ground fault detector. The method also includes receiving from the ground fault detector an output signal in response to the test signal when the ground fault detector is operative, and activating an alarm if the output signal is not received after a second period longer than the first period.

The method may include outputting a second test signal to the ground fault detector only if the circuit inhibitor signal is output, and applying an oscillation to a test circuit in response to the second test signal. The method may also include comparing an object circuit and the test circuit for the oscillating signal by the ground fault detector, and receiving from the ground fault detector the output signal if the comparison indicates a grounded neutral condition.

These and other advantages of the invention will be apparent to those of ordinary skill in the art by reference to the following detailed description and the accompanying drawings.

DETAILED DESCRIPTION

The present invention provides an automatic self-test function to a residential GFCI circuit breaker product. A completely independent circuit (GAST) automatically generates an actual periodic ground fault signal for the GFCI circuit. The GFCI must respond with a correct trip signal in order to prevent the actuation of a continuous visual or audible alarm. The GFCI Automatic Self-Test (GAST) will not cause an actual circuit breaker trip condition to occur.

The present invention of a GAST automatically checks the functionality of the ground fault detection circuit and issues a visual, auditory, both, or other appropriate indication. The GAST is implemented as an independent watchdog circuit that automatically periodically generates an actual ground fault error signal (identical to the PTT actuation) and/or simulates a grounded neutral condition. The GAST circuit also disables the trip SCR 150 during the self-test sequence. This prevents any nuisance trip conditions during the automatic self-test. Unless the GFCI circuit responds with a valid trip signal (also referred to herein as a breaking signal or output signal), the GAST will independently cause an auditory, visual, both, or other indication. The automatic self-test sequence is configured for, but not limited to, a frequency of 3 times a minute.

Figure 2:
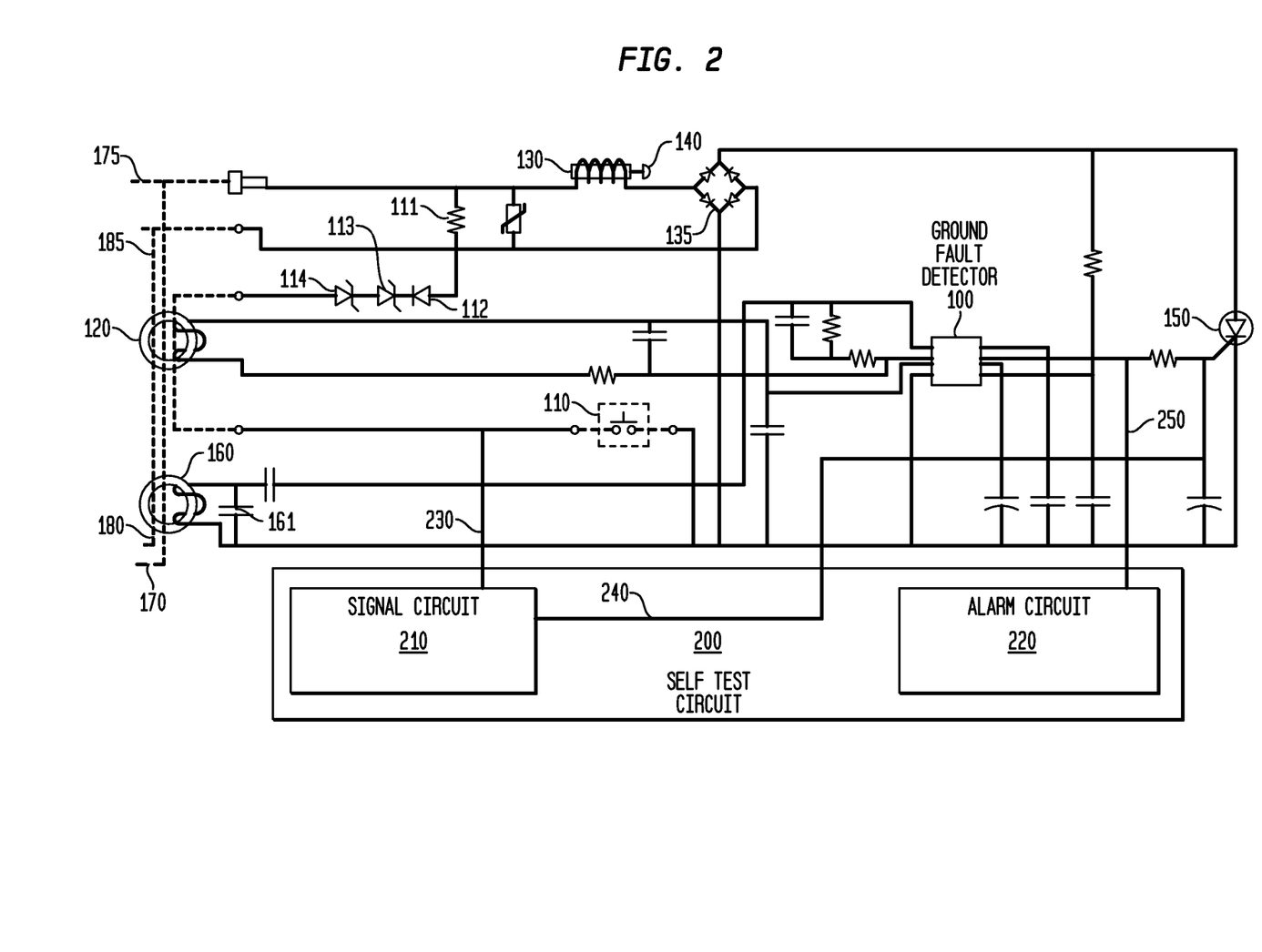
FIG. 2 illustrates the ground fault interrupter circuit of FIG. 1 with a schematic drawing of an exemplary embodiment of the GFCI Automatic Self-test (GAST) circuit.

FIG. 2 is an exemplary version of the GAST implementation showing general functional blocks of the GAST. FIG. 2 illustrates GAST 200 (also referred to herein as GFCI automatic self-test circuit 200) electrically coupled to the GFCI circuit. This GAST implementation can be configured from discrete elements, linear functional elements, or a microprocessor supported by discrete elements. FIG. 2 includes the conventional ground fault circuit interrupter including ground fault detector 100. GAST 200 includes signal circuit 210 and alarm circuit 220. Signal circuit 210 has two outputs, a first output on line 230 connects to an output of press-to-test button 110. A second output of signal circuit 210 is on line 240 and is electrically coupled to a gate of SCR 150. Line 250 connects to an output of ground fault detector 100. Alarm circuit 220 receives an input from the GAST 200 on line 250.

Figure 3:
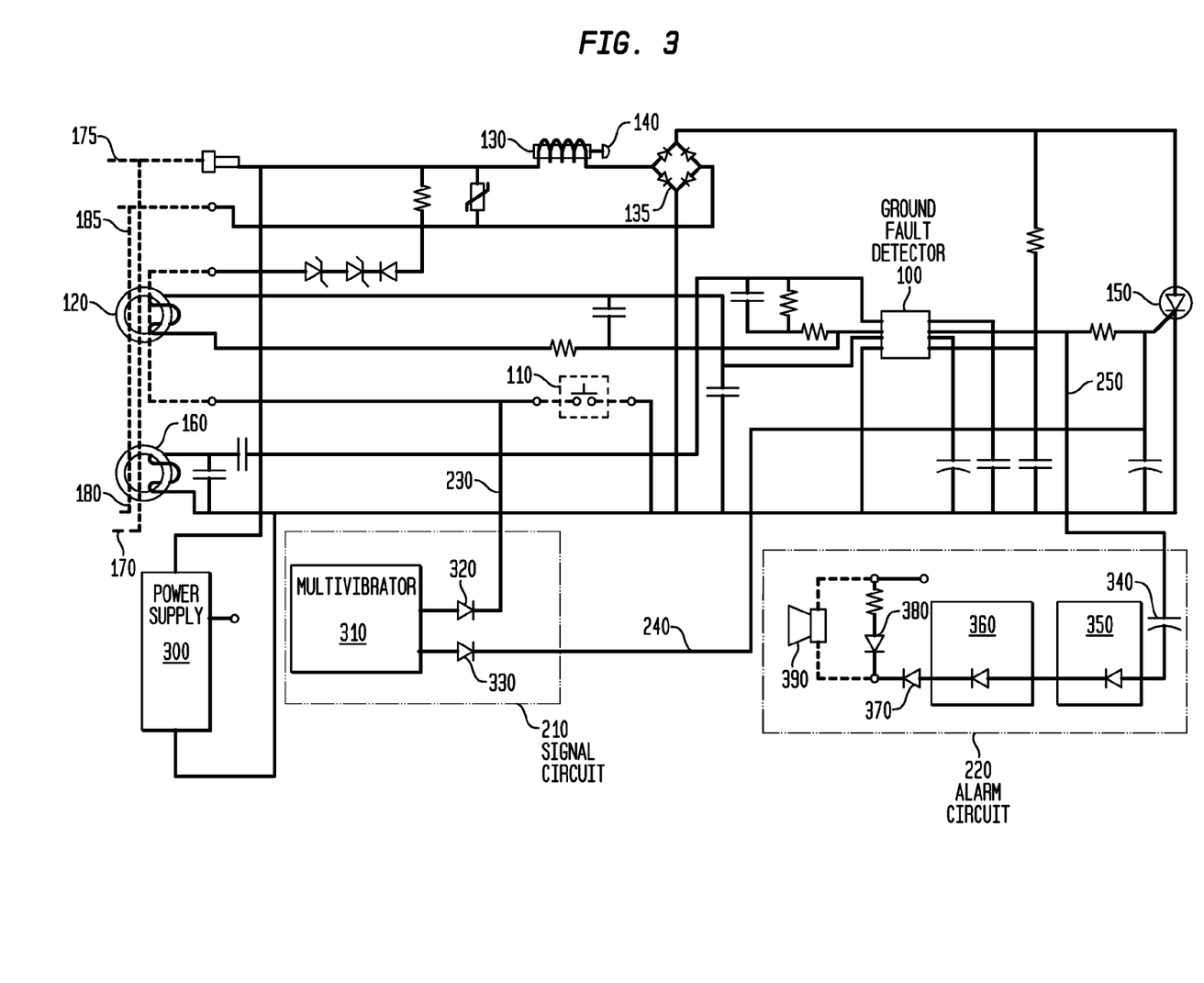
FIG. 3 illustrates the ground fault interrupter circuit of FIG. 1 with a schematic drawing of another exemplary embodiment of the GFCI Automatic Self-test (GAST) circuit.

FIG. 3 illustrates the circuit shown in FIG. 2 with additional structural detail of the basic functional blocks, namely, power supply 300, astable multivibrator 310, GFCI response detector 350, retriggerable monostable 360, driver 370, audible alarm 390 and visual alarm 380. FIG. 3 includes power supply 300 which connects to line 175, which is a hot line, and supplies power for GAST 200. The power supply may be a halfwave diode type that is sourced directly from the power connector of the breaker. Thus, it may not be dependent on the functional state of any of the GFCI circuit elements. For example, if solenoid coil 130 or diode bridge 135 develops an open circuit condition, the GAST may not be affected and may continue to operate normally. The power supply is configured to supply 12V dc in this implementation, but is not limited to this level.

Figure 5:
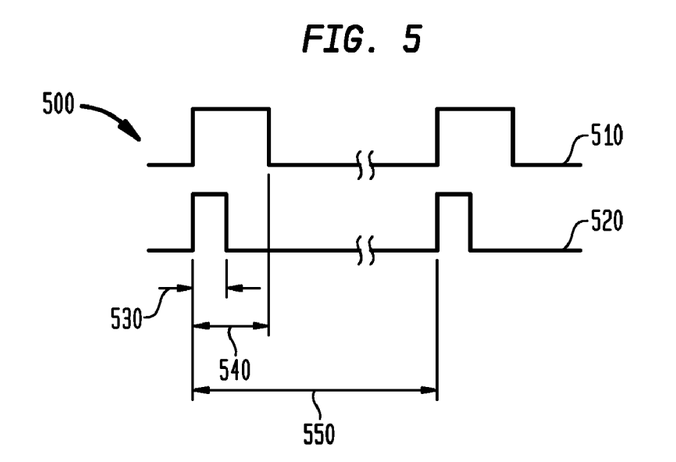
FIG. 5 illustrates timing waveforms of the test signal and circuit inhibitor signals.

Signal circuit 210 includes astable multivibrator 310 outputting two signals. A first signal output from astable multivibrator 310 passes through driver 320 to line 230. A second output of astable multivibrator 310 is emitted to driver 330 and connects to line 240. Signal circuit 210 of FIG. 3 may output SCR inhibitor signal 510, which is shown in FIG. 5, and which may be transmitted on line 240. Low frequency astable multivibrator 310 also provides an accompanying pulse (called test signal 520 and shown in FIG. 5) with the same frequency but with a narrower width that is used to generate the self-test function on line 230. Thus the astable multivibrator 310 continuously generates two periodic synchronized signals, test signal 520 and SCR inhibit signal 510. In order to insure that no nuisance trips occur during the GAST operation, SCR inhibit signal 510 extends for a duration equal to or greater than test signal 520. This timing relationship insures that no self-test trip condition exists when the SCR inhibit is released.

The generation of test signal 520 on line 230 causes a ground fault current imbalance which should be detected by the ground fault detector 100. Upon correct response to this ground fault, ground fault detector 100 issues a breaking signal. This breaking signal will not have an effect on SCR 150 as the gate of SCR 150 has been effectively grounded by SCR Inhibit signal 510 on line 240. However, this breaking signal will be directed to alarm circuit 220 on line 250. Since ground fault detector 100 can fail in either output state, it may be preferable that alarm circuit 220 only detect changes in the output signal, not discrete levels. For example, alarm circuit 220 may detect a low-to-high transition shaped by capacitor 340, resistor 424, and diode 425 (shown in FIG. 4), as opposed to detecting a predetermined voltage level. In this manner, the exemplary system may detect a failure in which detector 100 outputs a continuous "high" output on line 250.

Figure 6:
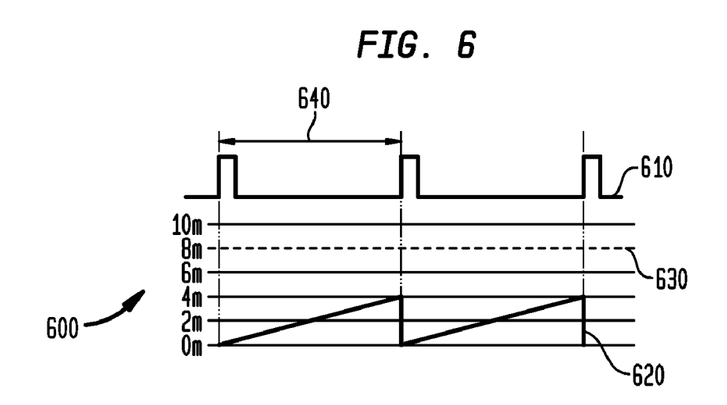
FIG. 6 illustrate timing waveforms of a detector circuit and a retriggerable monostable.

Alarm circuit 220 is illustrated in FIG. 3 to include capacitor 340 on line 250. From capacitor 340, line 250 connects to an input of GFCI response detector 350. GFCI response detector 350 connects to retriggerable monostable 360. Retriggerable monostable 360 outputs to driver 370 (also referred to herein as alarm driver 370). Alarm driver 370 is electrically coupled to alarm 390 and LED 380, which may provide an alarm indicating a failure in ground fault detector 100. The signal received on line 250 provides an input transition, causing a discharge pulse that, in effect, restarts a capacitive charge (shown as ramping voltage 620 in FIG. 6) within retriggerable monostable 360. The successful self-test of ground fault detector 100 will periodically discharge capacitor 340, preventing it from charging to predetermined alarm threshold 630 (as shown in FIG. 6). If the aforementioned level is exceeded, alarm driver 370 will be continuously turned on causing a visual, auditory, both, or other alarm indication, until a resetting signal received on line 250 is received at detector circuit 350.

Figure 4:
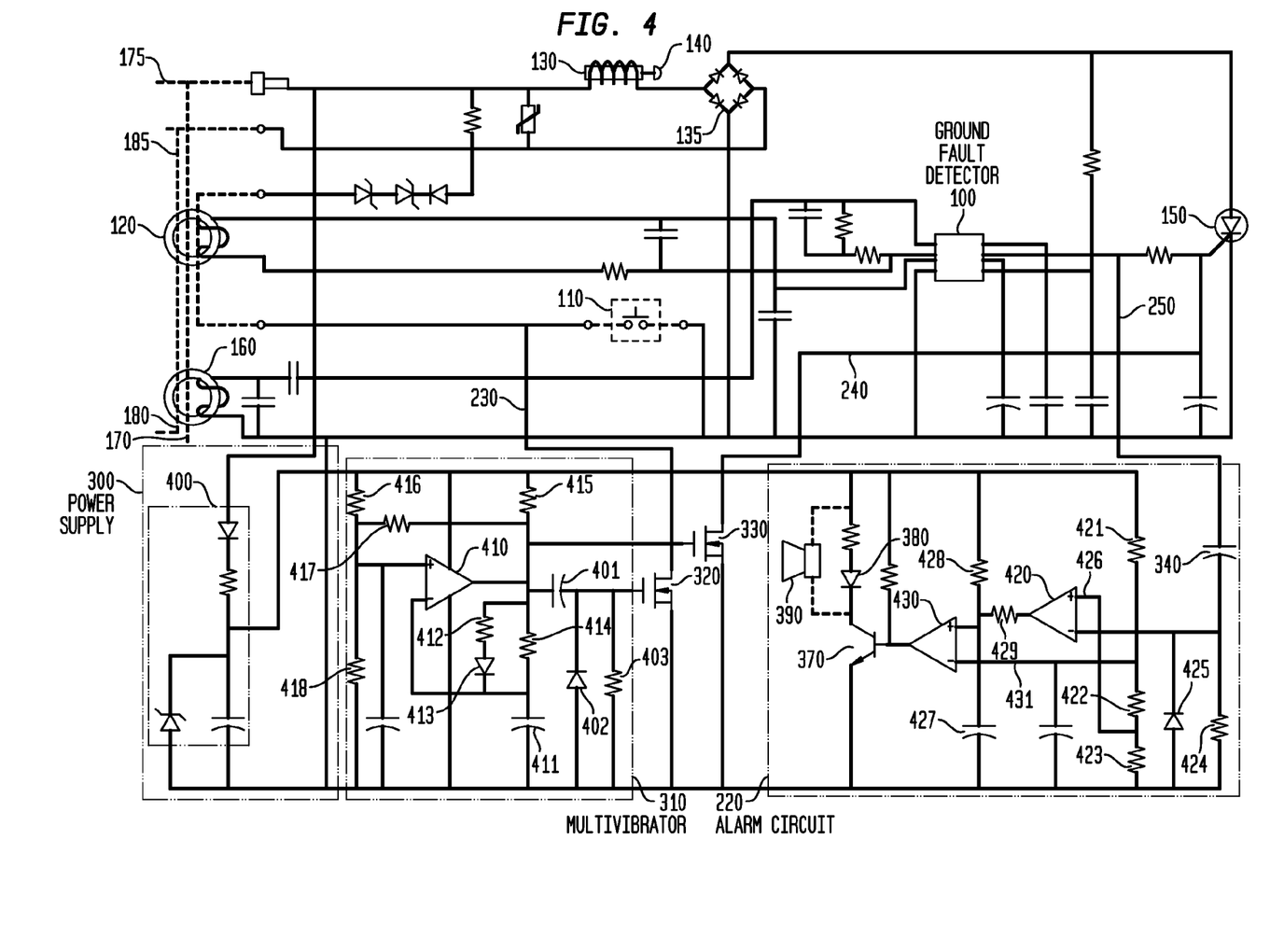
FIG. 4 illustrates the ground fault interrupter circuit of FIG. 1 with a schematic drawing of a tri-comparator embodiment of the GFCI Automatic Self-test (GAST) circuit.

FIG. 4 illustrates a tri-comparator embodiment of the ground fault circuit interrupter automatic self-test. As previously mentioned, the embodiment of the GAST circuit is not limited to this tri-comparator concept, and can alternatively be configured using a microprocessor. However, the tri-comparator embodiment may provide high reliability, low cost, low operating current, and low RF emissions and susceptibility. Each of the dedicated voltage comparators discussed herein may also be implemented using a general purpose operating amplifier.

In FIG. 4, the zener diode power supply 400 includes an independent halfwave rectified, zener regulated +12V voltage source. Low frequency astable multivibrator 310 includes first comparator 410. This stage generates a free-running oscillation frequency of 0.0476 Hz, or about 3 pulses per minute with a duty cycle of 0.9%. Thus this self-test function is exercised for a time that is less than 1% of the total active GFCI monitoring time. Capacitor 411 and charge/discharge elements 412, 413, 414, and 415 form the low frequency time constant. Diode 413 and resistor 412 may reduce the duty cycle to less than 1%. Resistors 416, 417, and 418 form a voltage reference and hysteresis network for first comparator 410. Two outputs are made available from low frequency astable multivibrator 310. The first output on line 240 is SCR inhibit signal 510, which is applied to the gate of SCR 150, preventing it from turning on. This pulse may be about 191 ms in duration. Driver 330 provides the switching function. The second output on line 230 provides test signal 520 and is effectively applied across Press To Test button 110. Thus, this output electrically duplicates the function of Press To Test button 110, causing a ground fault imbalance. This pulse is, by design, narrower than SCR inhibit signal 510. Test signal 520 may be a pulse of about 80 ms in duration. The narrower pulse width is produced by the differentiating network of elements 401, 402, and 403. Driver 320 provides the switching function.

Second comparator 420 detects the response of ground fault detector 100. Since the ground fault detector 100 can fail with an output of various fixed voltage levels, GFCI Response Detector (element 350 in FIG. 3) only reacts to a low to high transition on line 250 output from ground fault detector 100. Elements 421, 422, and 423 form a voltage reference source for second comparator 420 and third comparator 430. Capacitor 340 couples line 250 into an input of second comparator 420. Resistor 424 and diode 425 develop this signal to appropriate levels. If this signal exceeds the voltage threshold level at line 426, which is input into second comparator 420, the output of second comparator 420 will go to a low state. This will effectively discharge capacitor 427, forcing its charge state to approximately zero volts. When the ground fault detector 100 output pulse is completely coupled through capacitor 340, second comparator 420 turns off, removing the low discharge path from capacitor 427. Thus, capacitor 427 is free to charge to the power supply source voltage (for example, +12 v) through resistor 428. Resistor 429 safely limits the capacitor discharge current into the comparator output stage. The successful periodic self-test GFCI output detection effectively limits the charge voltage of capacitor 427 to about +4 Volts.

If the self-test of the GFCI fails due to a defective component within the GFCI circuit, thereby causing the output on line 250 to be effectively uninterrupted, then capacitor 427 will be allowed to charge to the power supply voltage level of +12 v. Third comparator 430 will detect this occurrence as it monitors the voltage level on capacitor 427. When this voltage level exceeds the reference value of +8 Volts, or another appropriate alarm threshold level 630, on line 431, third comparator 430 will turn on the alarm driver 370. This bipolar driver may provide operational current for LED 380, auditory alarm 390, both, or may provide any other appropriate alarm. The auditory alarm device may be a piezo electric-type buzzer. This alarm state will remain continuous, thus alerting the homeowner that the GFCI breaker is defective, and must be replaced. The alarm will be canceled upon a subsequent cycle of test signal 520 if ground fault detector 100 outputs a breaking signal indicating that it is operative.

FIGS. 5 and 6 illustrate timing waveforms. FIG. 5 illustrates the outputs 500 of signal circuit 210 of FIG. 3, which may include SCR inhibitor signal 510 emitted by low frequency astable multivibrator 310. Low frequency astable multivibrator 310 may operate at a frequency of about 0.0476 Hz, or one pulse every 21 seconds (about 3 pulses per minute, shown in FIG. 5 as period 550), and may emit SCR inhibit signal 510 that is 191 ms wide (shown in FIG. 5 as width 540). Low frequency astable multivibrator 310 may also provide an accompanying pulse (called test signal 520) with the same frequency but with a narrower width of 80 ms (shown in FIG. 5 as width 530).

FIG. 6 illustrates the wave forms operating within alarm circuit 220. Breaking signal 610 is an exemplary output of ground fault detector 100 under the influence of signal circuit 210. Period 640 may therefore have the same period as period 550 shown in FIG. 5, which illustrates the period of test signal 520, as well as SCR inhibit signal 510. Signal 610 is output on line 250 when ground fault detector 100 operates properly in response to test signal 520, and operates to discharge a capacitor which is subject to ramping voltage 620. Ramping voltage 620 represents the voltage on capacitor 427 and an input to retriggerable monostable 360 and alarm driver 370. Ramping voltage 620 ramps up from a low voltage to a high voltage until a signal of low voltage to high voltage is received on line 250, as in the form of signal 610. If, however, signal 610 is not received by detector 350 and passed through to retriggerable monostable 360, ramping voltage 620 will continue to increase past alarm threshold 630, which is carried on line 431. After reaching alarm threshold 630, ramping voltage signal 620 operates to cause retriggerable monostable 360 to activate alarm driver 370.

Figure 7:
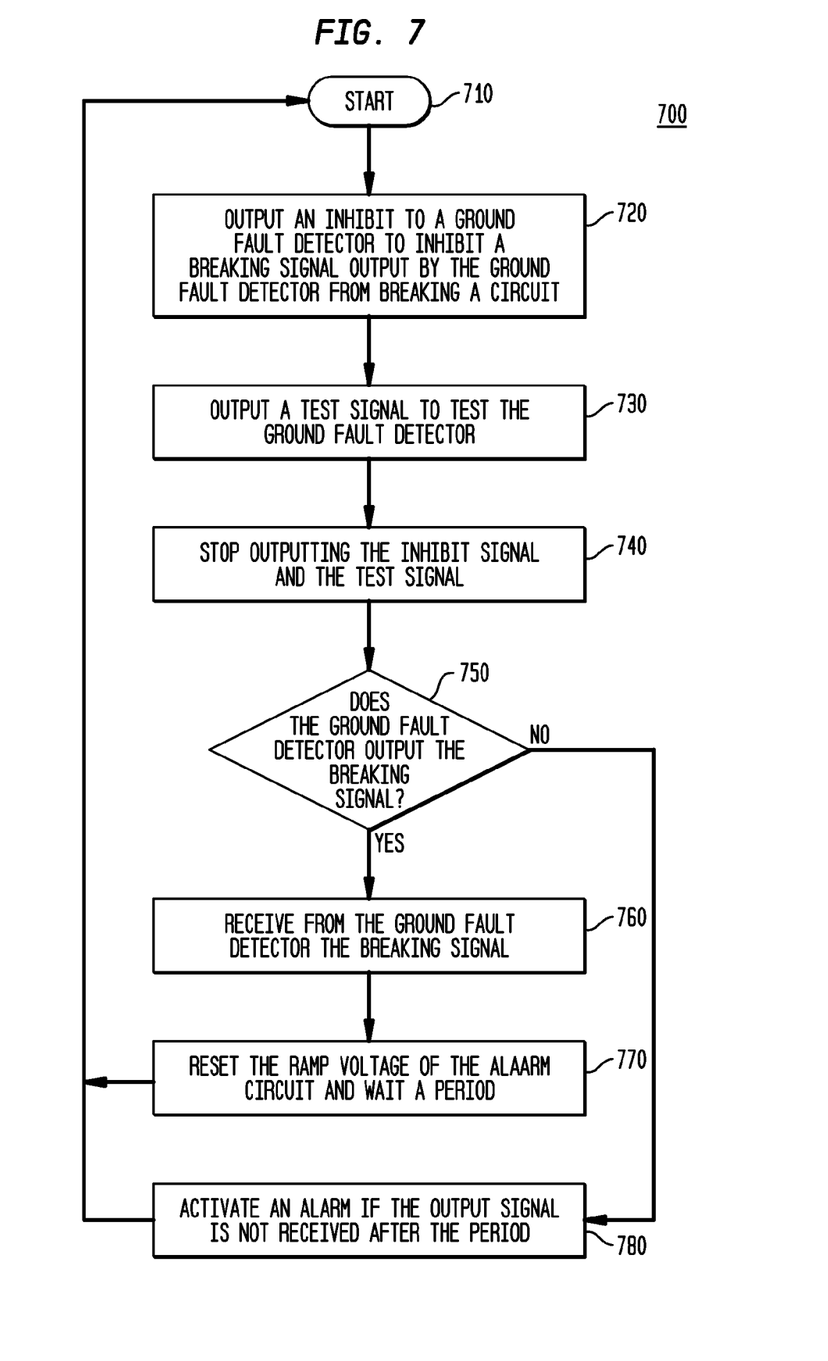
FIG. 7 is a flowchart illustrating an exemplary method according to the present invention.

FIG. 7 illustrates a method according to an exemplary embodiment of the present invention. The method of claim 7 may be performed by a circuit or system, and specifically may be performed by circuits composed of discrete elements, integrated circuits, microprocessors, or any combination thereof. The method of FIG. 7 starts at circle 710 and proceeds to operation 720, which indicates to output an inhibit signal to a ground fault detector to inhibit a breaking signal output by the ground fault detector from breaking a circuit. The flow proceeds from operation 720 to operation 730, which indicates to output a test signal to test the ground fault detector. The flow then proceeds to operation 740, which indicates to stop outputting the inhibit signal and the test signal. The flow proceeds from operation 740 to decision 750, which asks, "Does the ground fault detector output the breaking signal?" If the response to decision 750 is affirmative, the flow proceeds to operation 760, which indicates to receive from the ground fault detector the breaking signal. From operation 760, the flow proceeds to operation 770 which indicates to reset the ramp voltage of the alarm circuit and wait a period. The flow proceeds from operation 770 back to start circle 710. If the response to decision 750 is negative, the flow proceeds to operation 780, which indicates to activate an alarm if the output signal is not received after the period. From operation 780, the flow proceeds to start circle 710.

In another exemplary embodiment of the present invention, the test signal (also referred to herein as the master test signal or ST_OUT) may be spliced into a ground fault test signal (also referred to herein as the test signal or GF_ST_OUT) and a grounded neutral fault test signal (also referred to herein as the second test signal or GN_ST_OUT) to alternately test the ground fault (imbalanced current) detection circuit and the grounded neutral detection (dormant oscillator) circuit. The GN_ST_OUT signal closes a low resistance path (by for example a relay switch, switch 820 in FIG. 8) through transformer 120 and second transformer 160, simulating a grounded neutral fault. The coupling of the closed path from second transformer 160 to transformer 120 completes the oscillator circuit. Once the path is closed by switch 820 and line 830, the mutual coupling from transformer 160 to transformer 120 forms a positive feedback around a sense amplifier in ground fault detector 100 (for example, the RV4141A) and starts oscillating. The oscillation may also be detected in ground fault detector 100 with the same comparator circuit used to detect excessive ground fault current through the sense amplifier. The RV4141A outputs a breaking signal to SCR 150 to trip, which in other circumstances would activate solenoid 130 to activate plunger 140 to trip the circuit breaker. However, here the SCR_INH signal on line 240 inhibits the SCR from turning on, thereby causing this breaking signal to be detected by GFCI response detector 350.

Figure 8:
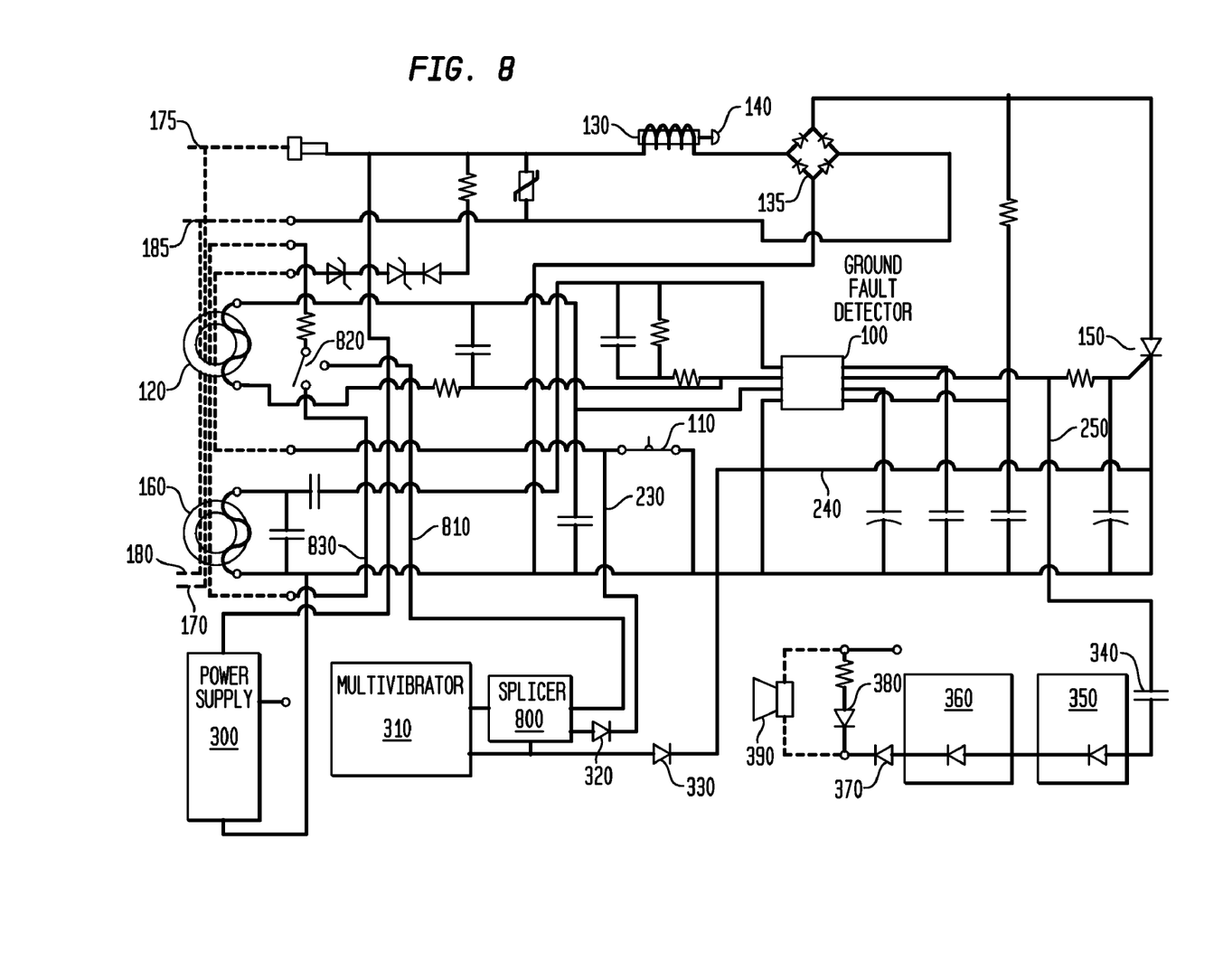
FIG. 8 illustrates the ground fault interrupter circuit of FIG. 1 with a schematic drawing of another exemplary embodiment of the GFCI Automatic Self-test (GAST) circuit including an automatic test for a grounded neutral short.

FIG. 8 illustrates this exemplary embodiment of the ground fault interrupter circuit including an automatic test for a grounded neutral fault. FIG. 8 adds this additional functionality to the GAST shown in FIG. 3. FIG. 8 includes splicer 800 at an output from astable multivibrator 310. Splicer 800 operates to divide into two signals the testing signal which was output to driver 320 and then to line 230 in the embodiment of FIG. 3. One of the two signals continues to be output on line 230 and passes through driver 320 to line 230 and operates to cause a ground fault current imbalance which should be detected by the ground fault detector 100, as discussed in regard to FIG. 3. The other signal output from splicer 800 is output on line 810 which operates switch 820. Switch 820 completes the circuit shown by line 830, which simulates a grounded neutral condition. Ground fault detector 100 includes an oscillator which tests for the grounded neutral condition, and which when operative will detect the completion of circuit 830. Ground fault detector 100 outputs a breaking signal when it is operative and when a grounded neutral condition is detected. Astable multivibrator 310 of FIG. 8 also outputs SCR inhibitor signal 510, which is output whenever either of the two test signals are output, thereby ensuring that the self-test does not result in a trip condition. The remainder of the circuit shown in FIG. 8 operates in the same manner as the circuit shown in FIG. 3.

Figure 9:
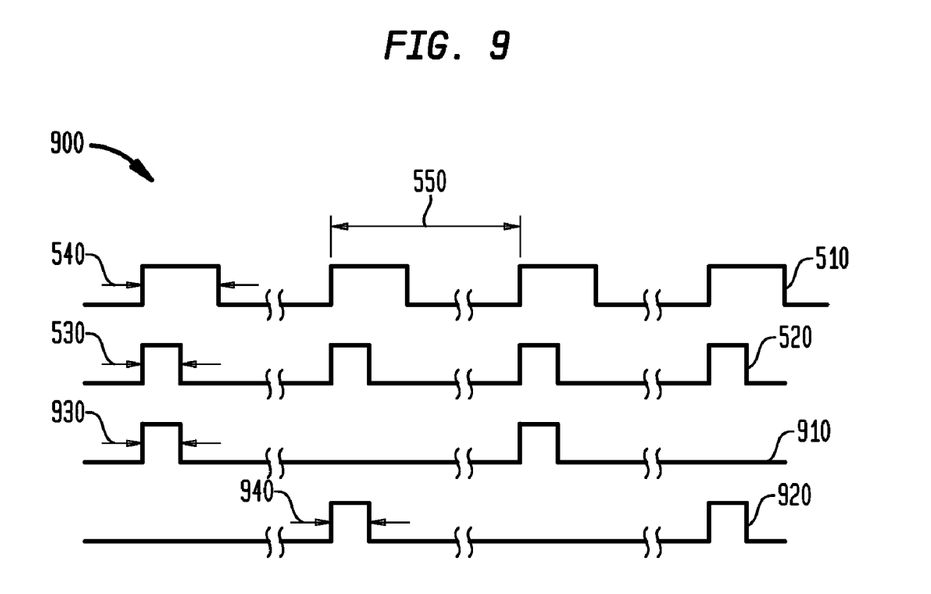
FIG. 9 illustrates timing waveforms of the test signal spliced into a first test signal for testing the GAST and a second test signal for testing the grounded neutral fault indicator, along with a circuit inhibitor signal.

FIG. 9 illustrates modified timing waveforms 900. Modified timing waveforms 900 include test signal 530 (also referred to herein as a master test signal) spliced into first test signal 910 for testing the GFCI and second test signal 920 for testing the grounded neutral fault indicator. Also shown in FIG. 9 is SCR inhibitor signal 510 having width 540 and period 550. Test signal 530 may be spliced into first test signal 910 and second test signal 920 by simply alternating pulses for each test signal. In this manner, test signal 530 may have the same period as SCR inhibitor signal 510, and first test signal 910 and second test signal 920 may have a period twice as long as test signal 530. Similarly, width 930 of first test signal 910 may be equal to width 940 of second test signal 920, which may be equal to width 530 of test signal 520.

The present invention is direct to an independent GFCI automatic self-test circuit that provides a visual, auditory, both, or other alarm function, that is based on the recognition of active ground fault detector transition outputs responding to a periodically induced test signal. An independent GFCI Automatic Self-test circuit may be comprised of an astable multivibrator, GFCI response detector, retriggerable monostable multivibrator, alarm driver, and half wave power supply. An independent GFCI automatic self-test circuit may also be based on the configuration of three comparators and support circuit elements. The independent GFCI automatic self-test function may alternatively be implemented with a microprocessor The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A self-test circuit, comprising:
   a signal circuit adapted to periodically output a circuit inhibitor signal to inhibit a breaking signal from a ground fault detector, the signal circuit also adapted to periodically output a test signal simulating a ground fault; and
   an alarm circuit adapted to receive an output signal from the ground fault detector in response to detecting the ground fault, and adapted to output an alarm when the ground fault detector is not operative.

2. The self-test circuit according to claim 1, wherein the circuit inhibitor signal and the test signal are both adapted to cycle at a first period and the circuit inhibitor signal is output at least when the test signal is output.

3. The self-test circuit according to claim 1, wherein:
the signal circuit is further adapted to periodically output a second test signal simulating a grounded neutral condition;
the test signal and the second test signal are alternating signals spliced from a master test signal; and
the circuit inhibitor signal and the master test signal are both adapted to cycle at a first period and the circuit inhibitor signal is output at least when the test signal and the second test signal are output.

4. The self-test circuit according to claim 3, wherein the ground fault detector is adapted to output the output signal in response to the second test signal when the ground fault detector is operative.

5. The self-test circuit according to claim 1, wherein the ground fault detector is adapted to output the output signal in response to the ground fault when the ground fault detector is operative.

6. The self-test circuit according to claim 1, wherein a transformer is electrically coupled to the ground fault detector and is adapted to measure the ground fault of an object circuit by comparing a neutral line current and a load line current of the object circuit.

7. The self-test circuit according to claim 6, wherein:
the ground fault detector includes an oscillator circuit coupled to a test circuit; and
a second transformer is electrically coupled by the test circuit to the ground fault detector to complete the oscillator circuit, the second transformer being adapted to measure a grounded neutral condition of the object circuit by comparing the object circuit and the test circuit for the oscillating signal.

8. The self-test circuit according to claim 1, wherein:
the alarm circuit includes a detector circuit electrically coupled to the ground fault detector and a retriggerable monostable electrically coupled to the detector circuit; and
the retriggerable monostable is adapted to contain a voltage that increases until the output signal is received by the detector circuit.

9. The self-test circuit according to claim 8, wherein the voltage contained in the retriggerable monostable is adapted to increase at a predetermined rate such that it takes a second period to reach a predetermined voltage from when the output signal is received by the detector circuit, the second period being longer than a first period of the test signal.

10. The self-test circuit according to claim 9, wherein:
an alarm output of the retriggerable monostable is adapted to be low unless the voltage exceeds the predetermined voltage; and
the alarm circuit includes an alarm adapted to receive the alarm output from the retriggerable monostable and adapted to activate when the alarm output is high.

11. The self-test circuit according to claim 1, wherein a circuit interrupter is electrically coupled to the ground fault detector and is adapted to receive the breaking signal from the ground fault detector when both the ground fault detector detects a ground fault of a circuit and the circuit inhibitor signal is not output from the signal circuit.

12. The self-test circuit according to claim 11, wherein the circuit interrupter includes a solenoid for receiving the breaking signal, the solenoid being adapted to break the circuit.

13. A ground fault circuit interrupter system, comprising:
a ground fault detector;
a signal circuit electrically coupled to the ground fault detector and for outputting a circuit inhibitor signal to inhibit a breaking signal from the ground fault detector, the signal circuit also for outputting a test signal to the ground fault detector; and
an alarm circuit electrically coupled to the ground fault detector and for receiving an output signal from the ground fault detector in response to the test signal.

14. The ground fault circuit interrupter system according to claim 13, wherein:
the signal circuit includes an oscillator;
the circuit inhibitor signal is a square wave having a first length and a first period;
the test signal is a further square wave having a second length and the first period;
the first length is equal to or greater than the second length; and
the circuit inhibitor signal and the test signal are synchronized so that during an entire time the test signal is output, the circuit inhibitor signal is also output.

15. The ground fault circuit interrupter system according to claim 13, wherein:
the signal circuit is further adapted to periodically output a second test signal simulating a grounded neutral condition;
the test signal and the second test signal are alternating signals spliced from a master test signal; and
the circuit inhibitor signal and the master test signal are both adapted to cycle at a first period and the circuit inhibitor signal is output at least when the test signal and the second test signal are output.

16. The ground fault circuit interrupter system according to claim 15, wherein the ground fault detector is adapted to output the output signal in response to the second test signal when the ground fault detector is operative.

17. The ground fault circuit interrupter system according to claim 13, wherein the alarm circuit does not receive the output signal from the ground fault detector in response to the test signal when the ground fault detector is inoperative.

18. The ground fault circuit interrupter system according to claim 13, further comprising a transformer electrically coupled to the ground fault detector and for measuring a ground fault of a circuit by comparing a neutral line current and a load line current of the circuit.

19. The ground fault circuit interrupter system according to claim 18, wherein:
the ground fault detector includes an oscillator circuit coupled to a test circuit; and
a second transformer is electrically coupled by the test circuit to the ground fault detector to complete the oscillator circuit, the second transformer being adapted to measure a grounded neutral condition of the object circuit by comparing the object circuit and the test circuit for the oscillating signal.

20. The ground fault circuit interrupter system according to claim 13, wherein:
the alarm circuit includes a detector circuit electrically coupled to the ground fault detector and a retriggerable monostable electrically coupled to the detector circuit; and
the retriggerable monostable contains a voltage that increases until the output signal is received by the detector circuit.

21. The ground fault circuit interrupter system according to claim 20, wherein the voltage contained in the retriggerable monostable is adapted to increase at a predetermined rate such that it takes a second period to reach a predetermined voltage from when the output signal is received by the detector circuit, the second period being longer than a first period of the test signal.

22. The ground fault circuit interrupter system according to claim 21,
- an alarm output of the retriggerable monostable is adapted to be low unless the voltage exceeds the predetermined voltage; and
- the alarm circuit includes an alarm adapted to receive the alarm output from the retriggerable monostable and adapted to activate when the alarm output is high.

23. The ground fault circuit interrupter system according to claim 13, further comprising a circuit interrupter electrically coupled to the ground fault detector and for receiving the breaking signal from the ground fault detector when the ground fault detector detects a ground fault of a circuit and the circuit inhibitor signal is not output from the signal circuit.

24. The ground fault circuit interrupter system according to claim 23, wherein the circuit interrupter includes a solenoid for receiving the breaking signal, the solenoid being adapted to break the circuit.

25. A method, comprising:
- periodically outputting a circuit inhibitor signal to a ground fault detector to inhibit a breaking signal from the ground fault detector, the circuit inhibitor signal being output at a first period;
- outputting a test signal to the ground fault detector only if the circuit inhibitor signal is output, the test signal testing the ground fault detector;
- receiving from the ground fault detector an output signal in response to the test signal when the ground fault detector is operative; and
- activating an alarm if the output signal is not received after a second period longer than the first period.

26. The method of claim 25, further comprising:
- outputting a second test signal to the ground fault detector only if the circuit inhibitor signal is output;
- applying an oscillation to a test circuit in response to the second test signal,
- comparing an object circuit and the test circuit for the oscillating signal by the ground fault detector; and
- receiving from the ground fault detector the output signal if the comparison indicates a grounded neutral condition.

* * * * *